Nov. 3, 1931.  J. H. MELLERS ET AL  1,830,067
GAS TORCH
Filed Aug. 23, 1929
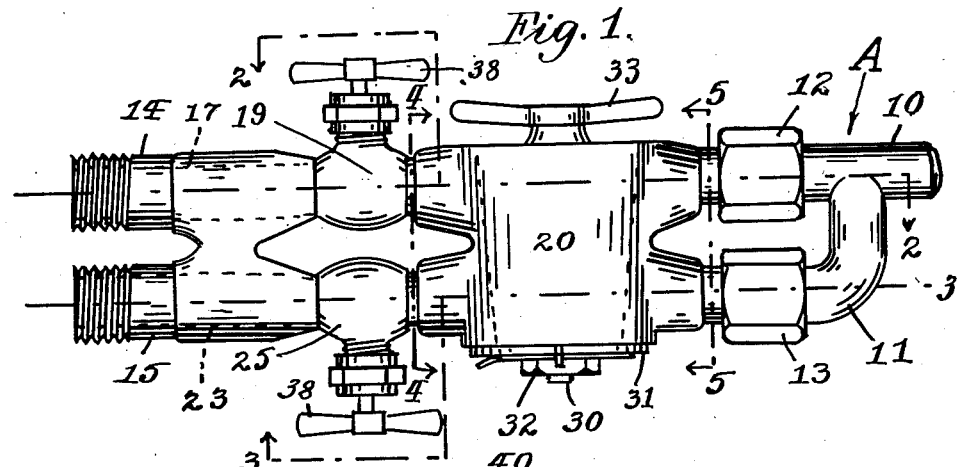
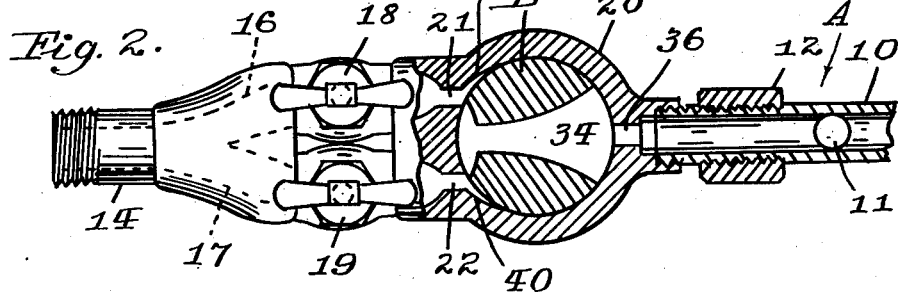
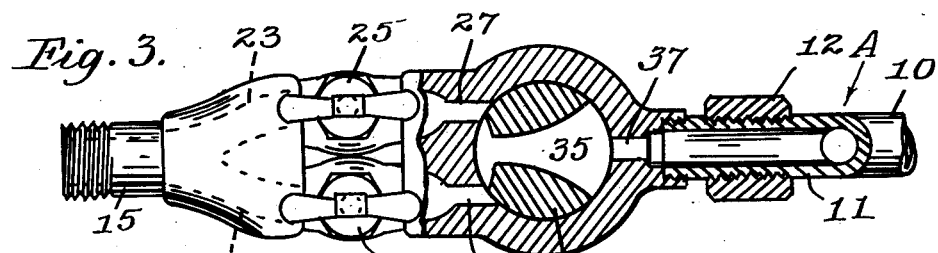
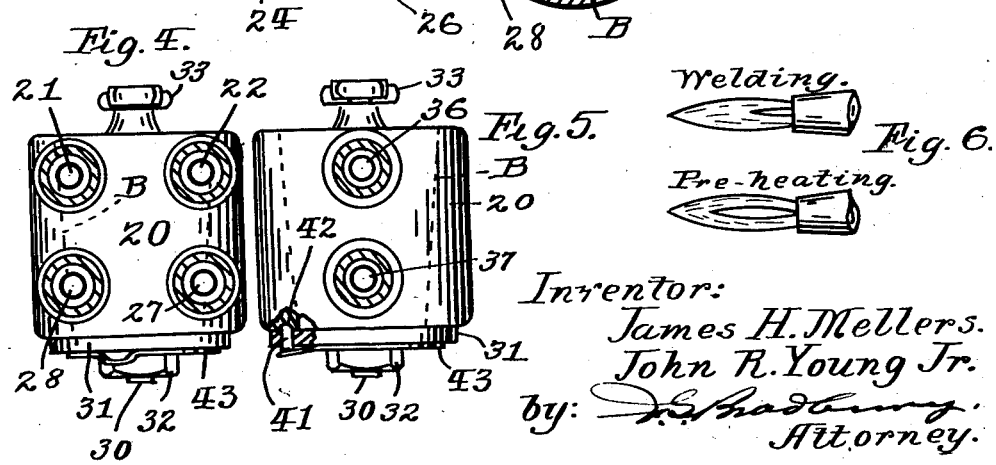
Inventor:
James H. Mellers.
John R. Young Jr.
by:
Attorney.

Patented Nov. 3, 1931

1,830,067

UNITED STATES PATENT OFFICE

JAMES H. MELLERS AND JOHN R. YOUNG, JR., OF COMPTON, CALIFORNIA

GAS TORCH

Application filed August 23, 1929. Serial No. 387,905.

Our invention relates to gas torches for the purpose of accomplishing what is known as autogenous welding and cutting of metals through the proper combustion of oxygen and another gas in such pre-adjusted proportions as will produce a neutral flame. In gas torches of the kind stated it has become burdensome and expensive due principally to time consumed by an operator, inefficiency in results attained and gas consumed to change from one kind of flame to another as for instance from a neutral mixture of gases for pre-heating metals to a neutral mixture for welding metals and as it is desirable to frequently and quickly make such changes it is an object of this invention to provide means for enabling an operator to change instantly from one kind of flame to another without loss of time and gas and without stopping to make any adjustments or new connections. Our invention also has for an object the provision of means for permitting the flow of lighting gas in the burner whereby the flame is never extinguished when the burner is changed from one kind of flame to another.

In the accompanying drawings forming part of this specification, Fig. 1 is a side elevation of our invention showing the valve mechanism by which the operation of the torch is controlled; Fig. 2 is a section taken on the line 2—2 of Fig. 1; Fig. 3 is a section taken on the line 3—3 of Fig. 1; Fig. 4 is a section taken on the line 4—4 of Fig. 1; Fig. 5 is a section taken on the line 5—5 of Fig. 1, and Fig. 6 is a picturization of two flames illustrating two distinct and separate mixtures of gases either of which is instantly available to an operator by the use of our invention.

In the drawings, A indicates a portion of a gas torch, which may be of any desired construction, that shown having the usual nozzle 10 and branch 11, which parts are connected with our improved valve mechanism by couplings 12 and 13 to receive acetylene and oxygen gases. Our improved valve mechanism has a pair of corresponding acetylene and oxygen supply ducts 14 and 15, threaded to receive couplings (not shown) for connecting with the usual flexible ducts leading from suitable supply sources of acetylene and oxygen. The acetylene duct 14 is bifurcated into two passages 16 and 17, the passage 16 being regulated and controlled by a hand operable needle valve 18 while the passage 17 is regulated and controlled by a hand operable needle valve 19. These valves 18 and 19 respectively regulate and control the acetylene gas entering a master valve housing 20, through inlet ducts 21 and 22.

The oxygen duct 15 is also bifurcated into two passageways 23 and 24, the passage 23 being regulated and controlled by a hand operable needle valve 25, while the passage 24 is regulated and controlled by a hand operable needle valve 26. These valves 25 and 26 respectively regulate and control the oxygen gas entering the master valve housing 20 through inlet ducts 27 and 28.

The master valve housing 20 contains a swivel master valve B, which resembles a circular tapering plug. This plug is revolubly held in the housing by a stud bolt 30 on its lower end, a ring 31 and a nut 32 secured on said stud bolt. The upper end of the valve has a handle 33 by which the valve can be turned. The valve B has a pair of transverse acetylene and oxygen passageways 34 and 35 placed correspondingly one above the other, the acetylene passage 34 beng adapted to connect the pre-adjusted supply ducts 21 and 22 with a duct 36 entering the gas torch tube 10, and the oxygen passage 35 being adapted to connect the pre-adjusted supply ducts 27 and 28 with a duct 37 entering the gas torch tube branch 11. The valve passages are of similar shape, and in one position of the master valve will form a communication for the pre-adjusted pair of acetylene and oxygen ducts 21 and 28 with ducts 36 and 37 entering the torch and in another position of the master valve will form a communication for the pre-adjusted pair of acetylene and oxygen ducts 22 and 27 with ducts 36 and 37 entering said torch. In median position of the master valve all of the pre-adjusted ducts are connected with the torch and in still another position all of the pre-regulated ducts are closed by the valve. The needle valves are closed, opened or regulated by turning their respective handles 38.

Thus a plurality of sets of pre-adjusted acetylene and oxygen gas supply ducts are provided, leading into a gas torch, all of the sets being controlled by a single valve so that the torch can be changed instantly at the will of the operator from one gas mixture to another according to the work in view. For instance the torch can be instantly changed from the "pre-heating" flame to the "welding" flame as shown in Fig. 6. These adjustments permit the use by pre-adjustment of the individual valves, 1st. of the neutral mixture for pre-heating metals and a neutral mixture for welding metals, 2nd. a large pre-heating mixture and a predominating or excessive acetylene mixture as used in hard facing metals, and 3rd. a predominating or excessive oxygen mixture as used in cutting metals to desired shape and a neutral mixture as used in welding any metal, or any other combination of mixtures desired. The passages in the valve B are constructed in such manner that they travel together from one position to another, including a complete shut off, and a possibility of permitting a setting at any desired adjustment for welding, cutting or any purpose desired.

The change from one mixture to another is made without an excessive flow of either gas of a mixture predominating. This would destroy a neutral flame and carbonize or oxidize any metal being operated upon and is objectionable. The reason for this improved operation is because the parts making connection with passages 21 and 22 or 27 and 28 are of sufficient width in both instances to cause equal opening and closing of both sets of passages or what is termed an even "change over" from one mixture to another. This is a distinct advantage when working all metals.

In moving from the position of being shut off to any desired mixture of the gases, lead openings 40 are arranged in the wall of the master valve housing 20, permitting the flow of acetylene lighting gas to first be admitted, thus making possible easy lighting followed by opening of oxygen gas as the valve continues its opening movement. At each position of the valve, a round headed pin 41, inserted through washer 31 and entering recesses such as 42 and held under pressure of flat spring washer 43 is adapted to hold the valve in any regulated pre-arranged position desired.

The walls of the various ducts, individual needle valves and master valve housing are welded or otherwise formed into a unitary structure thus making a single portable tool supporting the torch and regulating the supply of various mixtures of gases readily by the operator of the torch without loss of time and gas.

While we have chosen to show the torch coupled with ducts 36 and 37 and the supply of acetylene and oxygen entering by ducts 14 and 15, this position may be reversed and the torch used on the individual valve end of the structure and the gases supplied at the opposite end.

We have chosen also to illustrate two sets of instrumentalities for furnishing two pre-arranged mixtures of gases controlled by a single master valve but we wish it understood that any additional number of sets may be employed within the spirit of our invention. Various modifications and changes in details of construction are also contemplated within the spirit of our invention and the scope of the following claims.

Having described our invention what we claim as new and desire to secure by Letters Patent is:

1. In combination with a gas torch having a single burner tip, pairs of valved gas supply ducts, each pair being adapted to supply two kinds of gases to said single tip, the supply of each kind of gas being regulated, a master valve arranged to conduct the flow of gases through either selected pair of valved supply ducts to said tip to produce a selected pre-arranged neutral mixture of gases at said tip, said master valve having a housing and a swivel core in said housing, said housing being connected on opposite sides with said supply ducts and said burner tip and said swivel core being passaged to connect said supply ducts and said tip in one position and to shut off said connection in another position and said housing having lead openings therein compelling the flow of lighting gas to first be admitted followed by the admission of another gas as said master valve describes its opening movement.

2. In combination with a gas torch, a master valve housing having a pair of ducts for supplying different gases to said torch to produce pre-arranged neutral mixtures, pairs of valved gas supply ducts entering said housing, each pair delivering two kinds of gases, the supply of each gas being regulated, and a master valve conducting the flow of gases from either pair of valved gas supply ducts to said torch to produce a selected pre-arranged neutral mixture of gases at the tip of the torch, said housing being formed with lead openings into said ducts compelling the flow of lighting gas to first be admitted followed by the admission of another gas as said master valve describes its opening movement.

3. In combination with a gas torch, valved gas supply ducts adapted to supply a plurality of gases to the flame at the tip of the torch, the supply of each gas being regulated and a master valve arranged to control and change the flow of gases through said valved gas supply ducts to the tip of the torch to produce a predetermined mixture and supply of gases at said tip, said master valve having a passaged housing and movable core, said housing provided with lead openings entering part of said ducts and compelling the flow of lighting gas to first be delivered to said tip followed by the delivery of another gas as said core describes its opening movement and said lead openings being eliminated during the change over from one flame at said tip to the other.

4. In combination with a gas torch, valved gas supply ducts adapted to supply a plurality of gases to the flame at the tip of the torch, the supply of each gas being regulated and a master valve arranged to control and change the flow of gases through said valved gas supply ducts to the tip of the torch to produce a predetermined mixture and supply of gases at said tip, said master valve having a passaged housing and movable core, said housing provided with lead openings entering part of said ducts and compelling the flow of lighting gas to first be delivered to said tip followed by the delivery of another gas as said core describes its opening movement and said lead openings being eliminated during the change over from one flame at said tip to the other, and means for securing said core in adjusted position to prevent unintentional movement.

5. A gas torch, comprising, in combination, two pairs of individually valved gas supply ducts, a master valve having a housing into which the two pairs of supply ducts lead and from which a single pair of burner ducts emerge and a swiveled core movable to conduct gas from either pair of said supply ducts, said housing having leads from one of each pair of said supply ducts by which previous flow of gas from one duct of each pair on a side is compelled while no previous flow of gas is permitted during change over between pairs.

In testimony whereof we have signed our names to this specification.

JAMES H. MELLERS.
JOHN R. YOUNG, Jr.